(No Model.)
S. SEITZ.
ADJUSTABLE HANDLE FOR BAGS.
No. 574,456. Patented Jan. 5, 1897.
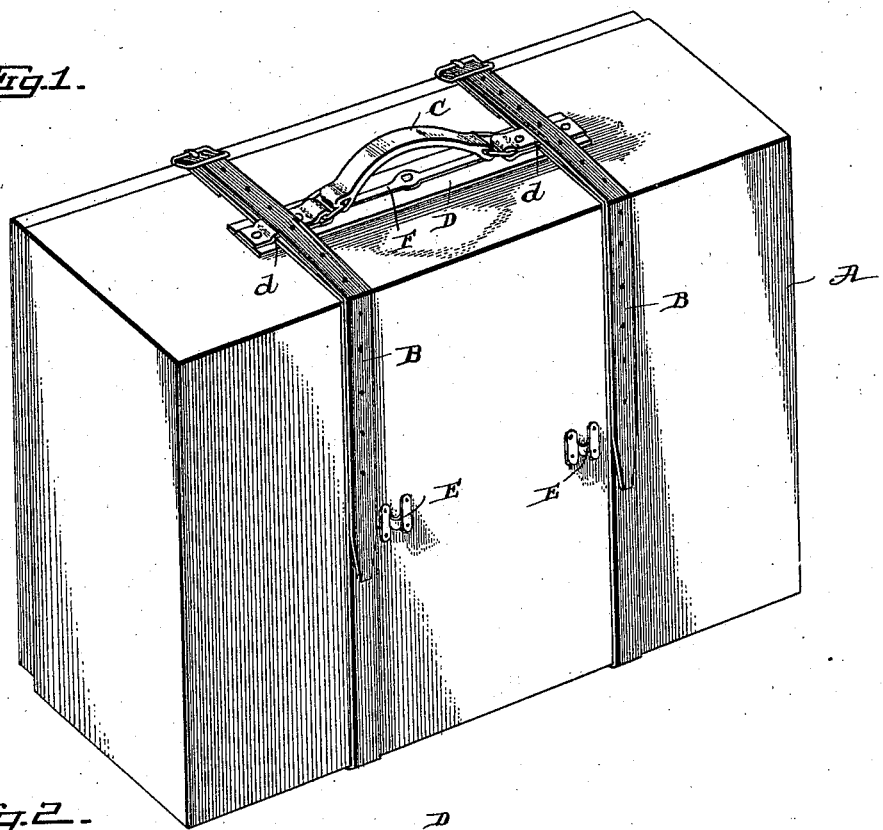
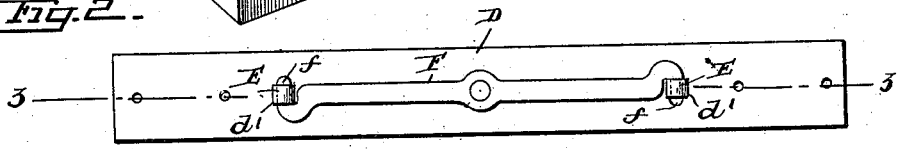
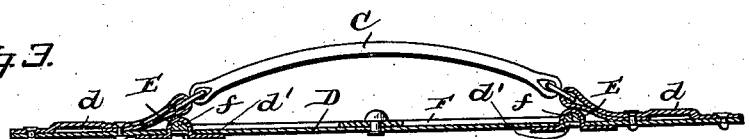
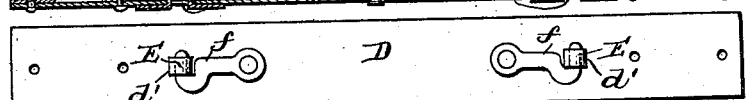
Witnesses. Inventor.

UNITED STATES PATENT OFFICE.

SAMUEL SEITZ, OF PHILADELPHIA, PENNSYLVANIA.

ADJUSTABLE HANDLE FOR BAGS.

SPECIFICATION forming part of Letters Patent No. 574,456, dated January 5, 1897.

Application filed April 16, 1896. Serial No. 587,803. (No model.)

*To all whom it may concern:*

Be it known that I, SAMUEL SEITZ, a citizen of the United States, residing at Philadelphia, county of Philadelphia, and State of Pennsylvania, have invented a new and useful Improvement in Adjustable Handle Attachments for Bags and Boxes, of which the following is a full, clear, and exact description, reference being had to the accompanying drawings, which form a part of this specification.

My invention has for its object to provide a handle for bags, boxes, or the like which is capable of being moved to any desired position around the box or bag and when at the desired point removably secured thereto, so that it will when in use have practically a fixed connection with the bag or box and yet be capable of being disconnected and moved to any other desired point.

I will first describe the specific embodiment of my invention illustrated in the drawings, and then point out the invention in the claims, although I do not intend to limit myself to that specific embodiment, except where the same may be specifically claimed.

In the drawings, Figure 1 is a perspective view of a telescopic box containing my improvement. Fig. 2 is a plan of plate D with handle and straps removed. Fig. 3 is a section on line 3 3, Fig. 2. Fig. 4 is a view similar to Fig. 2 of a modified form of embodiment of my invention.

A is a telescopic bag or box.

B B are a pair of straps. The plate D is connected to said straps by means of a loop $d$ on each end of said plate. The handle C is also connected to the plate D. By means of this connection between the plate D and straps B the plate, and with it the handle, may be moved around the box or bag to any desired point.

Secured upon the box or bag at desired points are the loops E E in pairs, one adjacent to each of the straps, and in the plate D are orifices $d'$ $d'$ corresponding to said loops, and in which orifices said loops are adapted to enter and pass beyond the outer surface of the plate D.

F is a lever or rod centrally pivoted upon the plate D and having the hook ends $f f$, the rod F being of such length and the hooks bent in opposite directions, so that when the loops E E pass through the plate D the rod may be swung so that the hooks will enter the loops above the plate and lock the plate D, and with it the handle C, fixedly to the bag.

In Fig. 4 is shown a modified form, in which I dispense with the rod F and pivot-hooks $f f$ independently of the plate D.

Having now fully described my invention, what I claim, and desire to protect by Letters Patent, is—

1. In combination, a bag or box, a handle, guides upon which said handle is adapted to move around said box or bag, and means to directly interlock said handle and bag or box.

2. In combination, a bag or box, straps for securing said bag or box, a handle loosely secured to and movable on said straps, and means to directly interlock said handle and bag or box.

3. In combination, a bag or box, a handle, guides upon which said handle is adapted to move around said box or bag, a device secured to the bag or box at desired points, and devices moving with the handle, said devices being adapted to interlock.

4. In combination, a bag or box, straps for securing said bag or box, a handle loosely secured to and movable on said straps, devices secured to the bag or box at desired points and devices moving with the handle, said devices being adapted to interlock.

5. In combination, a bag or box, straps for securing said bag or box, a plate, a handle secured to said plate, said plate being movably secured upon said straps, there being an orifice or orifices in said plate, loop projection or projections secured upon said bag or box at desired points, said loop or loops being adapted to pass through the orifice or orifices in the plate.

6. In combination, a bag or box, straps for securing said bag or box, a plate, a handle secured to said plate, said plate being movably secured upon said straps, there being an orifice or orifices in said plate, loop projection or projections secured upon said bag or box at desired points, said loop or loops being adapted to pass through the orifice or orifices in the plate, and devices carried by said plate adapted to lock said loops and plate when said loops project through the orifices in the plate.

7. In combination, a bag or box, straps for securing said bag or box, a plate, a handle secured to said plate, said plate being movably secured upon said straps, there being an orifice or orifices in said plate, loop projection or projections secured upon said bag or box at desired points, said loop or loops being adapted to pass through the orifice or orifices in the plate, and a pivoted lever having hook ends adapted to enter the loop when said loops project beyond said orifice.

In testimony of which invention I have hereunto set my hand.

SAMUEL SEITZ.

Witnesses:
FRANK S. BUSSER,
CAROL H. DESHONG.